(12) United States Patent
Artishdad et al.

(10) Patent No.: US 8,966,258 B2
(45) Date of Patent: Feb. 24, 2015

(54) METHOD FOR SECURELY DOWNLOADING FROM DISTRIBUTED DOWNLOAD SOURCES

(75) Inventors: Jerry John Artishdad, Karben (DE); Christian Hett, Niddatal (DE)

(73) Assignee: Artec Computer GmbH, Karben (DE)

( * ) Notice: Subject to any disclaimer, the term of this patent is extended or adjusted under 35 U.S.C. 154(b) by 207 days.

(21) Appl. No.: 13/521,874

(22) PCT Filed: Nov. 25, 2010

(86) PCT No.: PCT/EP2010/068252
§ 371 (c)(1),
(2), (4) Date: Jul. 23, 2012

(87) PCT Pub. No.: WO2011/091887
PCT Pub. Date: Aug. 4, 2011

(65) Prior Publication Data
US 2012/0290842 A1 Nov. 15, 2012

(30) Foreign Application Priority Data

Jan. 27, 2010 (DE) .......................... 10 2010 006 008

(51) Int. Cl.
*H04L 9/32* (2006.01)
*H04L 29/06* (2006.01)
*H04L 29/08* (2006.01)

(52) U.S. Cl.
CPC .......... *H04L 63/0428* (2013.01); *H04L 63/123* (2013.01); *H04L 67/06* (2013.01); *H04L 67/108* (2013.01)
USPC ......................................................... 713/168

(58) Field of Classification Search
None
See application file for complete search history.

(56) References Cited

U.S. PATENT DOCUMENTS

| 6,772,337 | B1 * | 8/2004 | Yener ............................. 713/165 |
| 7,263,497 | B1 * | 8/2007 | Wiser et al. ..................... 705/51 |
| 7,299,500 | B1 * | 11/2007 | Klebe et al. ..................... 726/26 |
| 2004/0172476 | A1 * | 9/2004 | Chapweske ................... 709/231 |
| 2005/0076210 | A1 * | 4/2005 | Thomas et al. ............... 713/165 |

\* cited by examiner

*Primary Examiner* — Brandon Hoffman
(74) *Attorney, Agent, or Firm* — Andrew Wilford

(57) ABSTRACT

The present invention deals with a method for securely downloading from distributed download sources. The greatest possible download security with a simultaneously minimized server load is achieved in this case. The object of the present invention was to provide an improved download method which also allows simple servers, without the possibility of setting up a secure connection, to be used as download servers and allows the total CPU load on the servers involved to be minimized, wherein the data transmission security can be kept the same, in comparison with a download from a single server, via a secure connection. This object is achieved by the method according to the invention for securely downloading from distributed download sources according to the main claim with the aid of a secure database server, a secure main server and 1 to n non-secure download servers, wherein the non-secure download servers newly encrypt the symmetrically encrypted download packets at predefined intervals of time independently of the secure main server.

13 Claims, 1 Drawing Sheet

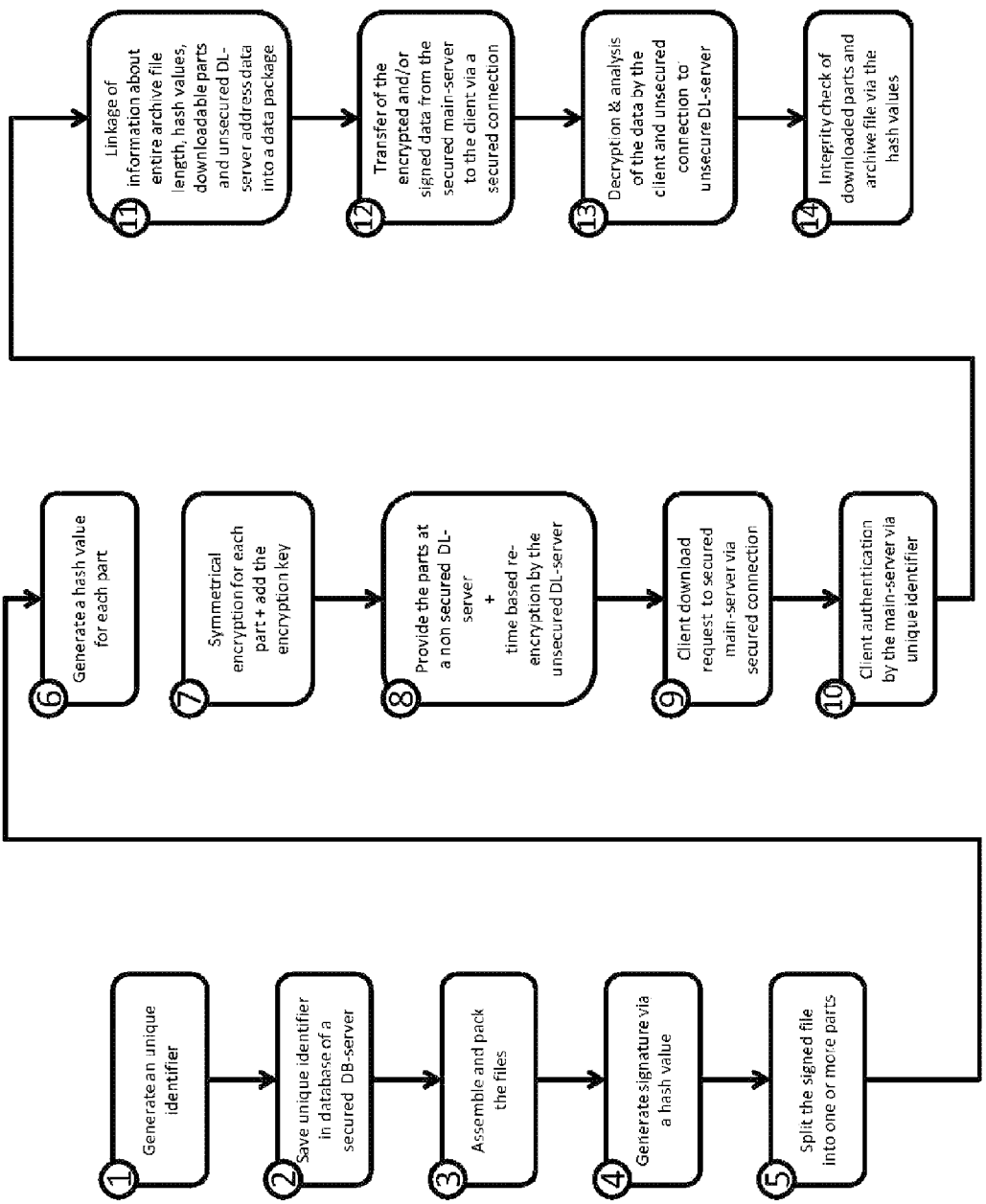

METHOD FOR SECURELY DOWNLOADING FROM DISTRIBUTED DOWNLOAD SOURCES

CROSS REFERENCE TO RELATED APPLICATIONS

This application is the US-national stage of PCT application PCT/EP2010/068252 filed 25 Nov. 2010, published 4 Aug. 2011 as WO2011/091887, and claiming the priority of German patent application 102010006008.9 itself filed 27 Jan. 2010.

FIELD OF THE INVENTION

The present invention relates to a method of securely downloading from distributed download sources. The greatest possible download security with a simultaneously minimized server load is needed for this.

BACKGROUND OF THE INVENTION

If one or more files are to be made available for download to a multitude of clients, it is standard for the files that are to be downloaded not to be prepared and held at the ready on one server; instead, they are placed on several servers in order to allow for load distribution and greater available bandwidth.

If it is necessary for the files to be transferred securely and in an encrypted format, and in order to protect them against unauthorized access, tampering and unauthorized viewing, according to generally known methods, all servers that hold files available must have at least the possibility of establishing a secure connection, provided the files were encrypted even before being distributed across the servers. When distributing files across several servers in order to distribute load and higher bandwidth, it is thus not possible to rely on especially cheap, leased storage space on simple servers that do not establish secure connections.

In addition, by setting up a secure connection a considerably higher CPU load is generated on the server in comparison to an unsecure connection, because the server must calculate the encryption for each connection during the transmission. Correspondingly, when a large number of connections, it is necessary to have high-performance servers available in order to provide the required computing power.

OBJECT OF THE INVENTION

In view of these disadvantages of known methods of securely downloading from distributed download sources, it is the object of the present invention to provide an improved download method that also allows simple servers, which do not have the possibility of establishing a secure connection, to be used as download servers, thus minimizing the total CPU load on the involved servers maintaining the same level of security of the data transmission as a download from a single server via a secured connection.

SUMMARY OF THE INVENTION

This object is attained by a method according to the invention as described below.

BRIEF DESCRIPTION OF THE DRAWING

The instant invention is better shown in the attached drawing whose sole FIGURE is a schematic block diagram of the method.

SPECIFIC DESCRIPTION OF THE INVENTION

The method of this invention comprises as shown in the drawing at least the following steps:
generating a unique identifier for each client;
storing the unique identifier in a database on a secure database server;
assembling the files for the download;
compressing the files into an archive file;
generating a hash value for the archive file and using it to generate a signature of the archive file; dividing the signed archive file into one or more parts;
4 generating a hash value for each part;
symmetrically encrypting the one or more parts of the signed archive file and adding the used key to the information regarding the parts that are to be loaded in the transmitted data packet;
providing one or more parts for download on 1 to n non-secure download servers that then re-encrypt the symmetrically encrypted packets in predefined time intervals, and the keys that are used for this purpose bearing, preferably, a cryptographically secure current-status feature that is generated, in particular, by calculating the new key from a key that is commonly known to the main server and the download server, as well as the date of the day that can also be supplemented by the current time of day;
requesting the download by a client from a secure main server via a secure connection, in particular, a HTTPS or SSL connection, the client identifying itself to the main server using a unique identifier;
authenticating the client by the main server by a comparison of the transmitted identifier with clients that are deposited in the database as authorized;
linking of I) information regarding the total length of the signed archive file, indicating information as to the total length also being achieved implicitly by indicating all part lengths thus allowing for a calculation of same; and ii) its hash value, indicating the hash value being omitted if the hash values of all parts are contained in item iii); with iii) information regarding the parts to be loaded regarding the data packet and encryption and/or signature of the generated data packet, the information regarding the parts to be loaded for each part containing at least a) the offset of the part in the signed archive file or the position of the part in the sequence of the parts of the signed archive file; b) the length of the part, indicating the length of exactly one part being omitted if, in the context of the information regarding the total length under item I), the initial length of the signed archive file was given; c) the hash value of the part, indicating the hash value of the length of exactly one part being omitted if the hash value of the signed archive file has been indicated under item ii); and d) a download address or URL selected from the list of download addresses or URLs available on the 1 to n non-secure download servers;
transmitting the encrypted and/or signed data packet from the secure main server to the client via the secure connection that is, in particular, a HTTPS or SSL connection;
decrypting and analyzing the data packet by the client, establishing one or more non-secure connections to the transmitted addresses or URLs on one or more of the non-secure download servers and downloading the necessary parts;

checking the downloaded parts as well as the assembled archive in terms of its integrity using the transmitted hash values.

For carrying out the method according to the invention, a computer network is used that is characterized in that it contains at least one client computer, a secure main server and at least one non-secure download server, wherein a secure network connection is established between the client computer and the secure main server; in particular, a HTTPS or SSL connection;

a non-secure network connection is established between the client computer and the at least one non-secure download server; in particular, a HTTP or FTP connection; and a non-secure network connection is established between the secure main server and the at least one non-secure download server; in particular, a HTTP or FTP connection.

Preferred use of the method according to the invention is applicable for updates of the client by the one and/or several servers. Within the meaning of the application, the update therein includes only software updates as well as firmware updates or updates for the operating software for devices.

Each client is, first of all, rendered exactly identifiable by generating a unique identifier for the contacted server. These unique identifiers are then deposited on a secure database server in a database. In one preferred embodiment, generating the unique identifiers for each client includes at least the steps of assigning each client a unique ID;

generating a token consisting of a real random number for each client;

storing a) the ID and the token and/or b) the MAC address of the client in the database on the secure database server.

In case of a device, the unique ID can be, for example, the serial number of the device. In addition to the ID and the random token, the MAC address can serve as a further unique identifying feature and can also be included in the identifier, if necessary. For an update process, it is possible to supplement the identifier database by further data fields that are added to the respective identifiers containing, for example, information regarding licensed program or device functions, running times of licenses or, if necessary, any special aspects that may have to be observed with an update (in particular, language versions, regional requirements and provisions, etc.).

Subsequently, the files are assembled for downloading and compressed in an archive file. This process can be done automatically by scripts that use the information from the database, as well as by an administrator or human user otherwise authorized.

A hash value is then generated for the archive file, and the archive is signed using it. The signed archive file can either be used further in one piece or, which is highly preferred, divided into several parts. The parts therein must not necessarily all have the same size; their dimensions can be completely arbitrary.

It is preferred that the one or more parts of the signed archive file are, in addition, symmetrically encrypted, and the used key is added to the information regarding the parts that are to be loaded in the transmitted data packet. This allows for further enhancing the security of the data. Due to the additional encryption, it is no longer possible to recognize the parts from which information regarding their content could have been extracted, nor can their content be analyzed.

After a hash value has also been generated for each part, they are made available on 1 to n non-secure download is servers for downloading. Any additional symmetrical encryption accommodates the different security levels ranging from the main server to the less secure download servers. This ensures that the non-secure download servers re-encrypt the symmetrically encrypted packets in predefined time intervals such as, for example, once per day. Any such symmetrical re-encryption is advantageous because it does not take up much computing time.

The key for re-encryption is to be provided with a cryptographically secure current-status feature. This can be achieved, for example, by calculating the key for the re-encryption action by a hash algorithm based on a key that is commonly known to the main server and the download server, as well as the date of the day and, if necessary the current time of the day such as, for example, by an HMAC algorithm.

The current packet and the packet from the previous day are always obtained and any older packets can be deleted after the expiration of a set time interval such as, for example, after one day to save storage space on the download servers. The main server is able to calculate and give to the client, independently of the download servers, the above-referenced information regarding each part for the large data packet.

A secure main server handles the coordinating of the downloads. The client contacts the main server for the purpose of requesting the downloads via a secure connection that is, in particular, a HTTPS or SSL connection. The client therein identifies itself relative to the main server by its unique identifier. To authenticate the client, by querying the database, the main server checks if the transmitted identifier belongs to the authorized client.

In response to its download request, the client is receives from the main server a data packet that is generated by linking the total length of the signed archive file to the hash value of the signed archive file and information regarding the totality of the parts to be loaded. Contained in this information is for each part at least the offset of the part in the signed archive file, its length, its hash value and a download URL. The main server specifically selects the download URL for each client. Before transmitting a data packet from the secure main server via the secure connection to the client, the data packet is encrypted and/or signed.

When assembling the information into a complete, signed archive file and/or the parts thereof, it is possible to omit one piece of information because it can be calculated on the basis of the other pieces of information. For example, it is possible to omit the total length, if the length of the totality of the parts is known. Similarly, the position of the last part of the archive file logically follows, if either the position or the offset is known for all the other parts. Linking the part length with the download makes sense so that, when providing the position information, the parts can be written immediately at the correct location in a temporary file, and it is thus not necessary to wait for the completion of the downloading of all parts. Finally, for the hash values as well, the information as to the last part must be correct if the hash values for the remaining parts as well as for the total file are correct. In principle, it would suffice in this instance as well, if only the hash value of the total file is transmitted; because if it is correct, it would thus also indicate that all parts must also have been transmitted correctly and without having been tampered with. However, for downloading, it is more advantageous if the hash values of the parts are known because, in the event of a faulty transmission of a part, it can be immediately downloaded again without having to wait for the completion of the total download.

The client then decrypts, if necessary, the received data packet and analyzes the information regarding the partial downloads. Subsequently, it establishes one or more non-secure connections to the transmitted URLs on the one or more download servers in order to download parts. Once the parts are complete, they are checked by their respective transmitted hash values in order to ensure an error-free transmission. The checked parts are then assembled into the archive file, and the archive file in turn is checked by its hash value.

One embodiment of the method according to the invention provides that the content of the archive file is identical for all clients. Correspondingly, all clients receive a uniform and complete record, and the functions that are available for the user are determined by the licensing information and the like. If the user acquires a license for further functions between two updates, it must only be approved by transmitted licensing information. It is not necessary, however, to download any program files after the fact. This way, the management task of the update packets on the part of the provider is also simplified.

As an alternative option thereto, the files for the download archive are assembled individually for each client. The assembly preferably is done by the secure main server. However, it is also possible that the main server itself does not handle this task but instead passes it on to one or more computers that are connected within the local network. In this case, the secure main server is not an individual computer but a multiple-computer network or cluster. Any such configuration of the main server as comprising multiple networked individual computers is deemed within the scope of the present application.

It is especially preferred if the individual assembly of the files for the download archive is based on one or multiple features that are deposited in addition to the unique identifiers in the database. This way, it is possible to minimize downloading for each client, for example, by only transmitting files for licensed functions. It is, moreover, possible to take region-specific files into consideration such as, for example, character sets and voice files. Moreover, the provider has the option of providing one group or individual clients (for example, beta testers) specifically with one version of the software or, vice versa, to exclude them from it (for example, known incompatibilities, legal restrictions).

A preferred embodiment of the invention envisions that the data that are made available on the download servers do not correspond, in terms of their sizes, to the parts that are to be loaded and that information as to a corresponding download offset is added to the parts that are to the loaded in the transmitted data packet. Two advantages can be realized using this technique. On the one hand, a further security benefit is achieved in that the parts that are to be loaded are not stored as such on the download servers; instead, supplemented by random data before and/or after, they are stored as a file therein. Since the client knows, based on its received data packet, the exact length of the part as well as of the download offset, it is able to download only the part, while any attacker does not know what is junk data and what is a necessary data piece.

On the other hand, the download servers are also able to hold a completely prepared archive file instead of a multitude of part files at the ready. The main server is then able to define completely flexibly the parts that are to be loaded without new part data having to be transmitted by it to the download servers. All that is necessary is the calculation of the matching hash values that are then transmitted together with the new offsets and part lengths to the clients.

A GZIP- or LZMA-compressed tar archive is greatly preferred for use in connection with the archive file. Combining a tarball with the GZIP- or LZMA-compression algorithm, it is possible to achieve very good compression rates; plus, the generated archive files have the advantage that the data can only be reconstructed when the archive file is complete.

In an especially preferred embodiment, the connection between the clients and the servers is achieved by a WAN, in particular the internet. Moreover, the method is, naturally, also suited for an LAN such as, for example, a company network in which the computers of a large company are supplied with software updates via a central server.

Preferably, the secure main server makes the selection of the one or more non-secure servers for the downloading action of the requesting client based on the shortest possible distance or the geographic region that is determined by the IP addresses, and/or that is deposited in the database for each client, and/or when achieving preset transmission volumes. By these selection criteria, the main server can ensure a downloading action for the client that is a quick as possible and will, aside from balancing the loads of the download servers, take into consideration any free traffic on leased servers. If the free volume of the is running month has been reached on one server, the main server is able to simply exclude it for the remainder of the month from the URL transmission to the clients, thus keeping operating costs low.

According to a further embodiment, the secure main server can function as a database server and/or download server at the same time. Any such task combination is interesting, first and foremost, in cases when the main server does not appear as an individual computer but, as described above, as a computer cluster. The possibility that the main server can also act as a download server is also useful with regard to securing availability.

Furthermore, the archive file can be extended before the hashing and signature by a manifest that contains information regarding the files that are contained in the archive file such as, in particular, version and compatibility information, and a version number and/or a description of the archive are also incorporated into the transmitted data packet. Thus, it is possible to transmit information important for updates by the contained files, and it can be used by an installation routine.

One practical problem that presents itself in any system having distributed data sources consists in the availability of the individual servers that may or may not be loosely or tightly controlled by the main server in its capacity as the central administration instance. In the usual architectures that belong to the prior art, the main server itself is able to monitor its pool of download servers, no longer referencing unreachable servers in the next data packets. This way, however, the server does not learn if there are communication problems between the download servers and client systems, meaning download sinks. This can be the case, for example, if download servers are blocked on the client side by a defective configuration or firewalls.

One preferred method of preventing such undesired conditions consists in detecting such problematic conditions by return messages from the download servers to the main server. Subsequently, the download server/client links are then sorted in the context of an availability table, and the problems are recorded individually. Any automated management strategy can consist in excluding problem-afflicted connections during further attempts or by skipping generally unavailable download servers altogether for all clients. Using expedient, known evaluation tools, administrators are able to use the availability table for error resolution tasks.

The availability table—enhanced by data relevant for diagnosis-related tasks such as, for example, port numbers, error messages and individual protocol messages or logs—can, furthermore, serve for a distributed diagnosis of technical problems of the download servers. Certain error states of the download server may possibly only be reliably recognized from the client side; for example, let us imagine an instance in which, due to a defective configuration, the firewall of the download server allows administrative connections between the main server and download server via VPN, but no downloads from external clients.

Further embodiments of this general method follow:

If clients transmit a return message to the main server after a download and/or update, the main server can thus also learn whether individual clients have individual problems; for example, due to a firewall, local routing issues or wrongly configured MTUs in the router. Moreover, the main server is able to maintain statistics if the client not only reports the success or failure of the update and/or of the download of each part or daily information and the like, but if the client also transmits speed and duration. On the basis of this information, the main server is able to detect and ascertain, for example, which non-secure download server is best suited for which client, which provider network or which region.

In addition, this way, defective download servers are recognized much more reliably in comparison to the main server checking the download server directly for its availability (compare the instance mentioned above in which, due to a detective configuration, the firewall allows administrative connections between the main server and the download server via VPN but not from external clients.

The invention claimed is:

1. A method of securely downloading from distributed download sources, the method including the steps of:
generating a unique identifier for each client;
storing the unique identifier in a database on a secure database server;
assembling files to be distributed for the download;
compressing the files into an archive file;
generating a hash value for the archive file and using it to generate a signature of the archive file;
dividing the signed archive file into one or more parts;
generating a hash value for each part;
symmetrically encrypting the one or more parts of the signed archive file using a key and adding the used key to the information regarding the parts that are to be loaded in the transmitted data packet;
providing the one or more parts for download on 1 to n non-secure download servers, the non-secure download servers re-encrypting the symmetrically encrypted packets in predefined time intervals, the keys that are used for this purpose bearing a cryptographically secure current-status feature that is generated by calculating a new key from a key that is commonly known to the main server and the download server, as well as the date of the day that can also be supplemented by the current time of day;
requesting the download by a client from a secure main server via a secure HTTPS or SSL connection, the client identifying itself to the main server using a unique identifier;
authenticating the client by the main server by a comparison of the transmitted identifier with clients that are deposited in the database as authorized;
linking of
   i) information regarding the total length of the signed archive file, indicating information as to the total length also being achieved implicitly by indicating all part lengths thus allowing for a calculation of them; and
   ii) its hash value, indicating the hash value being omitted if the hash values of all parts are contained in item iii); with
   iii) information regarding the parts to be loaded regarding a packet and encryption or signature of the generated data packet, the information regarding the parts to be loaded for each part containing at least
      a) the offset of the part in the signed archive file or the position of the part in the sequence of the parts of the signed archive file;
      b) the length of the part, indicating the length of exactly one part being omitted if, in the context of the information regarding the total length under item I), the initial length of the signed archive file was given;
      c) the hash value of the part, indicating the hash value of the length of exactly one part being omitted if the hash value of the signed archive file has been indicated under item ii); and
      d) a download address or URL selected from the list of download addresses or URLs available on the 1 to n non-secure download servers;
transmitting the encrypted or signed data packet from the secure main server to the client via the secure connection that is, in particular, a HTTPS or SSL connection;
decrypting and analyzing the data packet by the client, establishing one or more non-secure connections to the transmitted addresses or URLs on one or more of the non-secure download servers and downloading the necessary parts;
checking the downloaded parts as well as the assembled archive in terms of their integrity using the transmitted hash values.

2. The method according to claim 1 wherein the generation of a unique identifiers for each client includes at least the steps of:
assigning each client a unique ID;
generating a token consisting of a real random number for each client;
storing
   a) the ID and the token or
   b) the MAC address of the client in the database on the secure database server.

3. The method according to claim 1 wherein the content of the archive file is identical for all clients.

4. The method according to claim 1 wherein the assembly of the files for the download archive is done by the secure main server for each client individually.

5. The method according to claim 4 wherein the individual assembly of the files for the download archive is done based on one or more features that are deposited in addition to the unique identifiers in the database.

6. The method according to claim 1, wherein the files that are made available on the download servers do not correspond in terms of size to the parts that are to be loaded and in that the information of a corresponding download offset is added regarding the parts to be loaded in the transmitted data packet.

7. The method according to claim 1, wherein the archive file is a GZIP- or LZMA-compressed tar archive.

8. The method according to claim 1, wherein the connection between the clients and the servers is achieved by a WAN.

9. The method according to claim 1, wherein the secure main server selects the one or more non-secure servers for the download by the requesting client based on the shortest possible distance, or the geographic region that is determined by the IP addresses or deposited in the database for each client, or the reaching of preset transmission volumes.

10. The method according to claim 1, wherein the secure main server functions simultaneously as database server or download server as well.

11. The method according to claim 1, wherein the archive file is extended by a manifest before the hashing and signature containing information regarding version and compatibility, and in that a version number or a description of the archive are also incorporated into the transmitted data packet.

12. The method according to claim 1, wherein the client transmits return information regarding the success or failure of the downloading attempt or the duration and speed of the downloading or the availability of the download server back to the main server.

13. A computer network for carrying out the method of claim 1, the network comprising at least one client computer, one secure main server and at least one non-secure download server, and wherein a secure network connection is established between the client computer and the secure main server; in particular, a HTTPS or SSL connection;

a non-secure network connection is established between the client computer and the at least one non-secure download to server; in particular, a HTTP or FTP connection; and a non-secure network connection is established between the secure main server and the at least one non-secure download server; in particular, a HTTP or FTP connection, the at least one non-secure download server comprising at least one memory for storing computer-executable instructions that, when executed by at least one processor, configures the processors to perform operations comprising re-encrypting the symmetrically encrypted packets in predefined time intervals, the keys that are used for this purpose bearing a cryptographically secure current-status feature that is generated by calculating a new key from a key that is commonly known to the secure main server and the at least one non-secure download server, as well as the date of the day that can also be supplemented by the current time of day.

* * * * *